(12) United States Patent
Fu et al.

(10) Patent No.: US 9,377,820 B2
(45) Date of Patent: Jun. 28, 2016

(54) FOOT CUSHION MECHANISM AND ELECTRONIC DEVICE THEREWITH

(71) Applicant: Wistron Corporation, New Taipei (TW)

(72) Inventors: Chuan-Cheng Fu, New Taipei (TW); Hung-Li Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 239 days.

(21) Appl. No.: 14/020,887

(22) Filed: Sep. 8, 2013

(65) Prior Publication Data

US 2015/0016057 A1 Jan. 15, 2015

(30) Foreign Application Priority Data

Jul. 15, 2013 (TW) .............................. 102125264 A

(51) Int. Cl.
*H05K 5/02* (2006.01)
*G06F 1/16* (2006.01)
*F03G 7/06* (2006.01)

(52) U.S. Cl.
CPC ................ *G06F 1/166* (2013.01); *F03G 7/065* (2013.01)

(58) Field of Classification Search
CPC ......... F03G 7/065; G06F 3/0208; G06F 1/20; G06F 1/66; G06F 1/1667; G06F 3/0216; G06F 1/1662; G06F 1/203; G06F 1/16; G06F 1/1601; G06F 1/1616; G06F 1/1618; G06F 1/162; G06F 1/1624; G06F 1/1637; G06F 1/166; G06F 1/1677; G06F 1/1656; G06F 1/1632; G06F 1/1679; G06F 1/1635; H05K 5/0234
USPC ........... 361/679.01, 679.55–679.59; 313/511; 455/575.1–575.4; 60/527
See application file for complete search history.

(56) References Cited

U.S. PATENT DOCUMENTS

| | | | |
|---|---|---|---|
| 6,496,369 B2 | 12/2002 | Nakamura | |
| 8,154,860 B2* | 4/2012 | Chen | ...................... F16M 13/00 135/66 |
| 8,278,551 B2 | 10/2012 | Fan | |
| 8,863,512 B2* | 10/2014 | Matsuki | .................. F03G 7/065 60/527 |
| 2008/0079129 A1 | 4/2008 | Ganapathysubramanian | |
| 2013/0141345 A1* | 6/2013 | Wang | .................. H04M 1/0266 345/173 |

FOREIGN PATENT DOCUMENTS

TW   I380762   12/2012

OTHER PUBLICATIONS

Office action mailed on Dec. 15, 2015 for the Taiwan application No. 102125264, filing date: Jul. 15, 2013, p. 1 line 13-14, pp. 2-6 and p. 7 line 1-21.

* cited by examiner

*Primary Examiner* — Anthony Haughton
*Assistant Examiner* — Ingrid Wright
(74) *Attorney, Agent, or Firm* — Winston Hsu; Scott Margo

(57) ABSTRACT

A foot cushion mechanism with lifting function is disclosed. The foot cushion mechanism includes a foot cushion member, a holding base and at least one shape memory material member. The foot cushion member is installed on a housing and abuts against a supporting surface. The holding base and the foot cushion member are respectively installed on opposite sides of the housing. The at least one shape memory material member selectively connects the housing and the holding base or connects the holding base and the foot cushion member. The at least one shape memory material member deforms when being heated due to a shape memory effect, and the housing is driven by the shape memory effect to move away from the foot cushion member such that a distance between the housing and the supporting surface is increased.

20 Claims, 16 Drawing Sheets

FOOT CUSHION MECHANISM AND ELECTRONIC DEVICE THEREWITH

BACKGROUND OF THE INVENTION

1. Field of the Invention

The present invention relates to a foot cushion mechanism and an electronic device therewith, and more particularly, to a foot cushion mechanism with lifting function and an electronic device therewith.

2. Description of the Prior Art

Generally speaking, a cushion of a notebook computer supports a housing of the notebook computer on a supporting surface, such as a desk, so as to form a gap between the housing and the supporting surface. The gap provides the notebook computer with a space for a heat dissipating module of the notebook computer to dissipate heat in a convective manner. However, the notebook computer recently has a trend of design with thin size and light weight, which constrains a thickness of the cushion. Thus, a sufficient gap between the housing and the supporting surface can not be provided. Accordingly, it results in poor convection and poor heat dissipation of the notebook computer. As a result, it causes inner temperature of the notebook computer to rise and thus affects performance of the notebook computer.

SUMMARY OF THE INVENTION

Thus, the present invention provides a foot cushion mechanism with lifting function to improve heat dissipation and an electronic device therewith for solving above drawbacks.

According to an embodiment of the present invention, a foot cushion mechanism includes a foot cushion member, a holding base and at least one shape memory material member. The foot cushion member is installed on a housing and abuts against a supporting surface. The holding base and the foot cushion member are respectively installed on opposite sides of the housing. The at least one shape memory material member selectively connects the housing and the holding base or connects the holding base and the foot cushion member. The at least one shape memory material member deforms when being heated due to a shape memory effect, and the housing is driven by the shape memory effect to move away from the foot cushion member such that a distance between the housing and the supporting surface is increased.

According to another embodiment of the present invention, the at least one shape memory material member connects the housing and the holding base, and the foot cushion mechanism further includes at least one connecting member passing through the housing and slidable relative to the housing. A first end of the at least one connecting member connects the foot cushion member, and a second end of the at least one connecting member connects the holding base.

According to another embodiment of the present invention, the at least one shape memory material member is made of one-way shape memory alloy material, and the foot cushion mechanism further includes a processing unit coupled to the at least one shape memory material member. A length of the at least one shape memory material member is shortened when the shape memory material member is heated by a power supplied by the processing unit such that the housing moves along a first direction farther away from the foot cushion member.

According to another embodiment of the present invention, the at least one shape memory material member is made of two-way shape memory alloy material, and the foot cushion mechanism further includes a processing unit coupled to the at least one shape memory material member. A length of the at least one shape memory material member is shortened when the shape memory material member is heated by a first power supplied by the processing unit such that the housing moves along a first direction farther away from the foot cushion member. The length of the at least one shape memory material member is lengthened when the shape memory material member heated by a second power supplied by the processing unit such that the housing moves along a second direction toward the foot cushion member.

According to another embodiment of the present invention, the at least one shape memory material member is a spring.

According to another embodiment of the present invention, the at least one connecting member is a rib.

According to another embodiment of the present invention, the at least one connecting member and the holding base are integrally formed.

According to another embodiment of the present invention, the at least one shape memory material member connects the holding base and the foot cushion member, and the foot cushion mechanism further comprises at least one bridging structure for bridging the holding base and the housing.

According to another embodiment of the present invention, the at least one shape memory material member is made of one-way shape memory alloy material, and the foot cushion mechanism further includes a processing unit coupled to the at least one shape memory material member. A length of the at least one shape memory material member is lengthened when the shape memory material member is heated by a power supplied by the processing unit such that the housing moves along a first direction farther away from the foot cushion member.

According to another embodiment of the present invention, the at least one shape memory material member is made of two-way shape memory alloy material, and the foot cushion mechanism further includes a processing unit coupled to the at least one shape memory material member. A length of the at least one shape memory material member is lengthened when the shape memory material member is heated by a first power supplied by the processing unit such that the housing moves along a first direction farther away from the foot cushion member. The length of the at least one shape memory material member is shortened when the shape memory material member is heated by a second power supplied by the processing unit such that the housing moves along a second direction toward the foot cushion member.

According to another embodiment of the present invention, the at least one shape memory material member is a guiding post.

According to another embodiment of the present invention, the at least one bridging structure and the holding base are integrally formed.

According to another embodiment of the present invention, the at least one shape memory material member is made of shape memory alloy material or shape memory plastic material.

According to another embodiment of the present invention, an electronic device includes a housing and a foot cushion mechanism. The foot cushion mechanism includes a foot cushion member, a holding base and at least one shape memory material member. The foot cushion member is installed on the housing and abuts against a supporting surface. The holding base and the foot cushion member are respectively installed on opposite sides of the housing. The at least one shape memory material member selectively connects the housing and the holding base or connects the holding base and the foot cushion member. The at least one shape memory material member deforms when being heated due to a shape memory effect, and the housing is driven by the shape memory effect to move away from the foot cushion member such that a distance between the housing and the supporting surface is increased.

In summary, the shape memory material member of the foot cushion mechanism of the present invention selectively connects the housing and the holding base or connects the holding base and the foot cushion member. When the shape memory material member of the foot cushion mechanism of the present invention is heated, the shape memory material member deforms due to shape memory effect, so as to drive the housing away from the foot cushion member. Accordingly, the distance between the housing and the supporting surface is increased. In other words, the foot mechanism of the present invention is used for lifting the housing for increasing the gap between the housing and the supporting surface, so as to enhance the efficiency of heat dissipation of the electronic device. As a result, the inner temperature of the electronic device drops as functioning and thus performance of the electronic device is enhanced. In addition, the foot cushion mechanism of the present invention can further recover the deformed shape memory material member by applying an external force or by current control, so as to contain the foot cushion mechanism on the electronic device for keeping aesthetic feeling of the electronic device.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
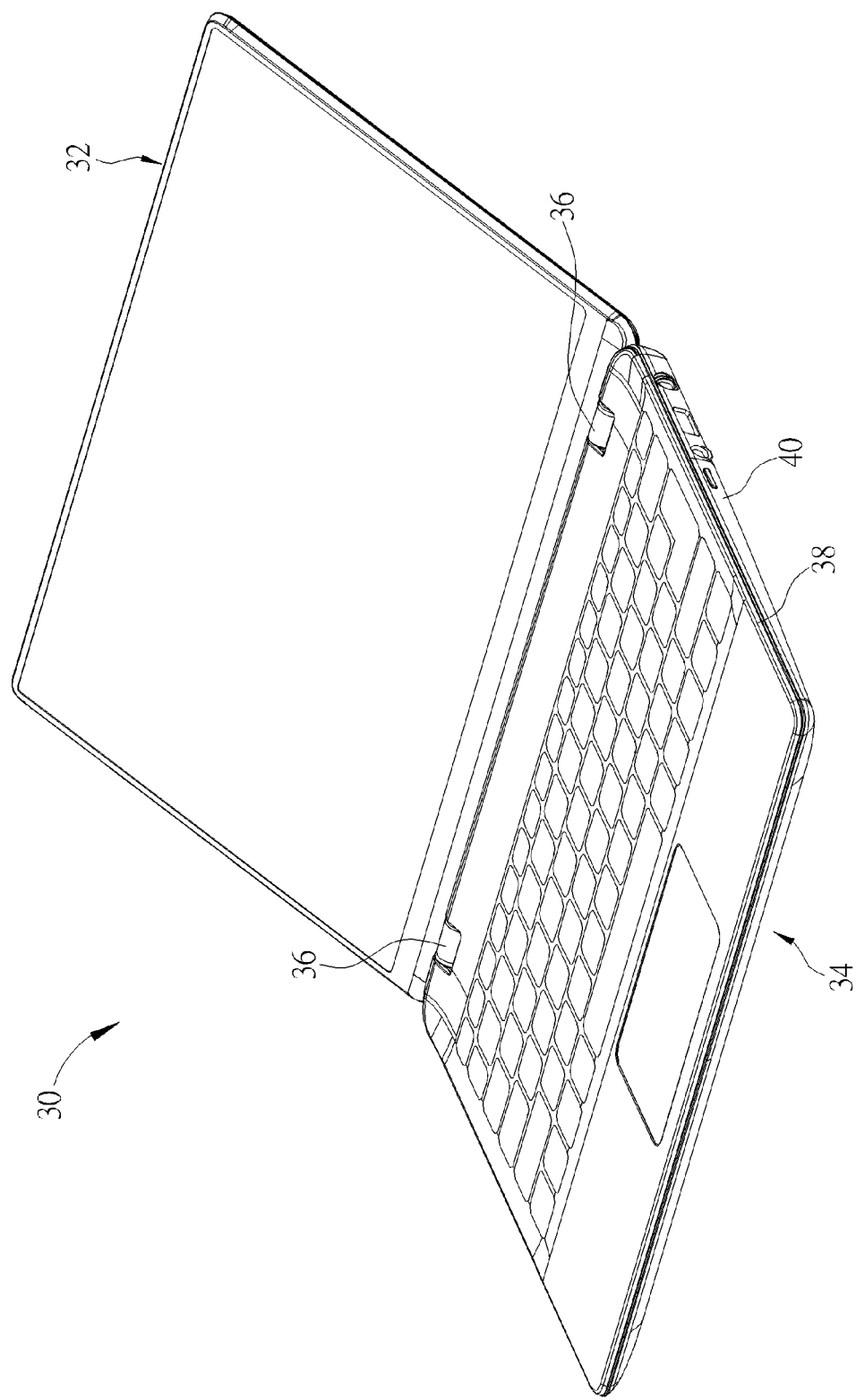
FIG. 1 is a diagram of an electronic device according to a first embodiment of the present invention.

Please refer to FIG. 1. FIG. 1 is a diagram of an electronic device 30 according to a first embodiment of the present invention. As shown in FIG. 1, the electronic device 30 includes a first module 32, a second module 34 and a hinge assembly 36. The hinge assembly 36 is used for pivoting the first module 32 and the second module 34, such that the first module 32 is pivoted to the second module 34 by the hinge assembly 36. Accordingly, the first module 32 can pivot to be expanded on the second module 34 for a user to operate the electronic device 30, or alternatively, the first module 32 can also pivot to be contained on the second module 34 for the user to store or carry the electronic device 30. In this embodiment, the electronic device 30 is a notebook computer, the first module 32 is a display module of the notebook computer, and the second module 34 is a host module of the notebook computer.

Figure 2:
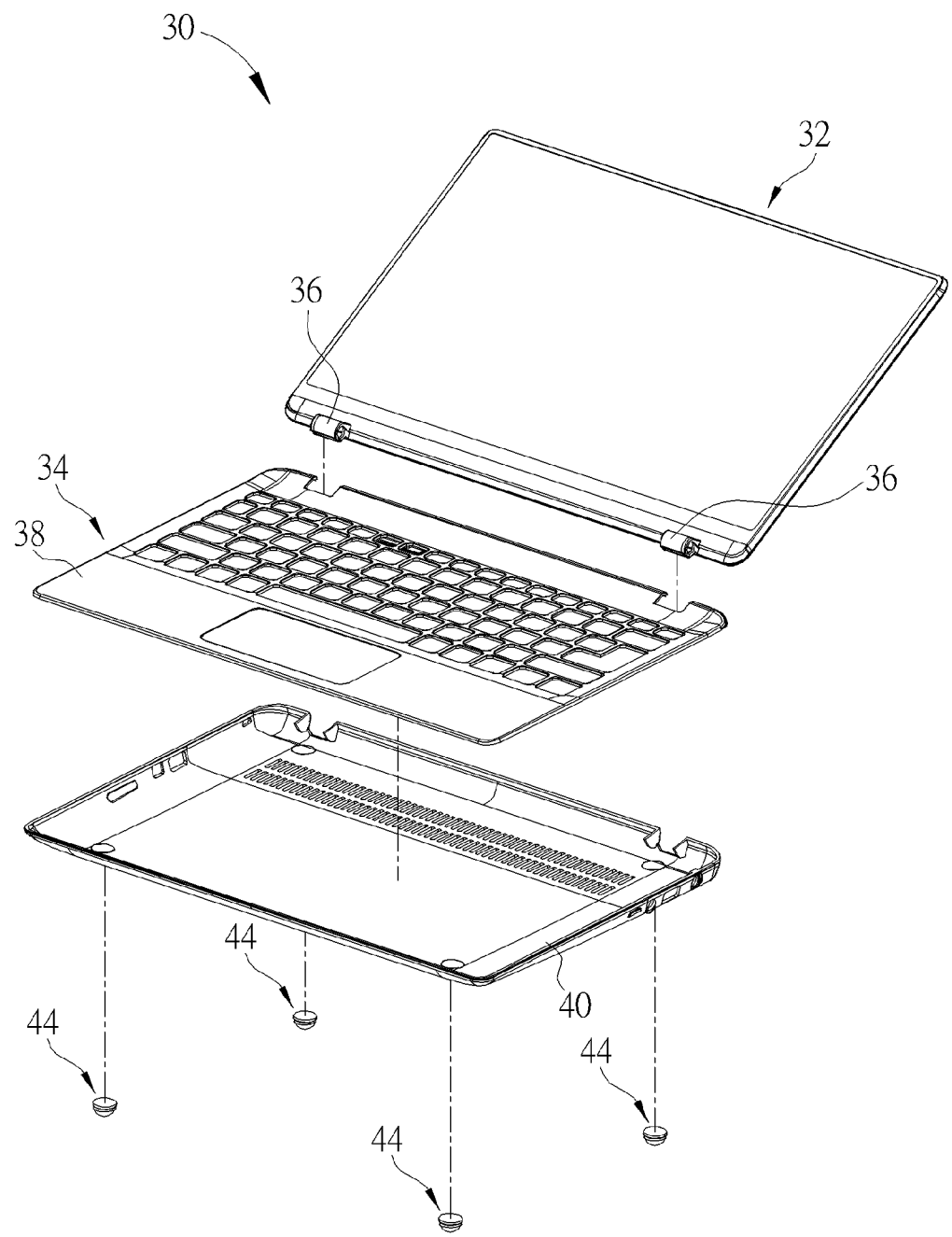
FIG. 2 is an exploded diagram of the electronic device according to the first embodiment of the present invention.
Figure 3:
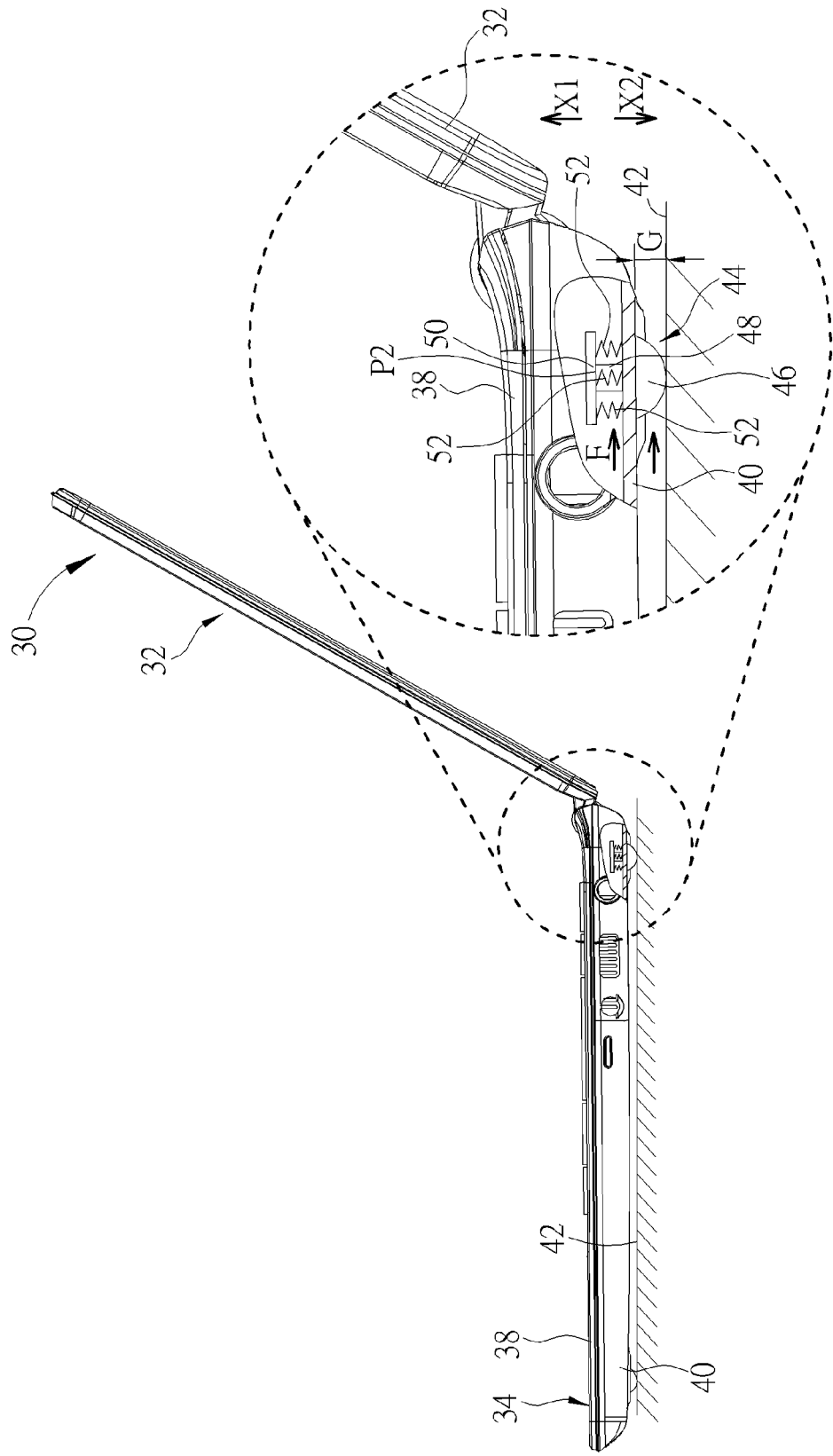
FIG. 3 is a partly sectional diagram illustrating that the electronic device is placed on a supporting surface according to the first embodiment of the present invention.

Please refer to FIG. 1 and FIG. 2. FIG. 2 is an exploded diagram of the electronic device 30 according to the first embodiment of the present invention. As shown in FIG. 1 and FIG. 2, the electronic device 30 further includes a casing 38 and a housing 40. The casing 38 and the housing 40 cooperatively cover inner components of the second module 34, so as to prevent the inner components of the second module 34 from damage due to collisions. Please refer to FIG. 3. FIG. 3 is a partly sectional diagram illustrating that the electronic device 30 is placed on a supporting surface 42 according to the first embodiment of the present invention. As shown in FIG. 3, the electronic device 30 further includes a foot cushion mechanism 44 for supporting the second module 34 on the supporting surface 42, so as to prevent the housing 40 of the second module 34 from being scratched by the supporting surface 42. Furthermore, the foot cushion mechanism 44 includes a foot cushion member 46, a connecting member 48, a holding base 50 and a shape memory material member 52. The foot cushion member 46 is installed on the housing 40 and abuts against the supporting surface 42. The connecting member 48 passes through the housing 40 and is slidable relative to the housing 40. The holding base 50 and the foot cushion member 46 are respectively installed on opposite sides of the housing 40, and a first end P1 of the connecting member 48 connects the foot cushion member 46. The holding base 50 connects a second end P2 of the connecting member 48, and the shape memory material member 52 connects the housing 40 and the holding base 50.

In this embodiment, the foot cushion mechanism 44 includes one connecting member 48 and three shape memory material members 52. Amounts of the connecting member 48 and the shape memory material member 52 are not limited to those mentioned in this embodiment, that is, structures of the foot cushion mechanism 44 including at least one connecting member 48 and at least one shape memory material member 52 are within the scope of the present invention. Furthermore, the connecting member 48 is a rib, the connecting member 48 and the holding base 50 are integrally formed, and structures of the connecting member 48 and the holding base 50 of the present invention are not limited thereto. For example, the connecting member 48 can be a guiding post as well, and the connecting member 48 and the holding base 50 can be two separate parts as well. During assembly, the connecting member 48 can be combined with the holding base 50 in a hot-melting or screwed manner. As for which one of the above-mentioned designs is adopted, it depends on practical demands.

Figure 4:
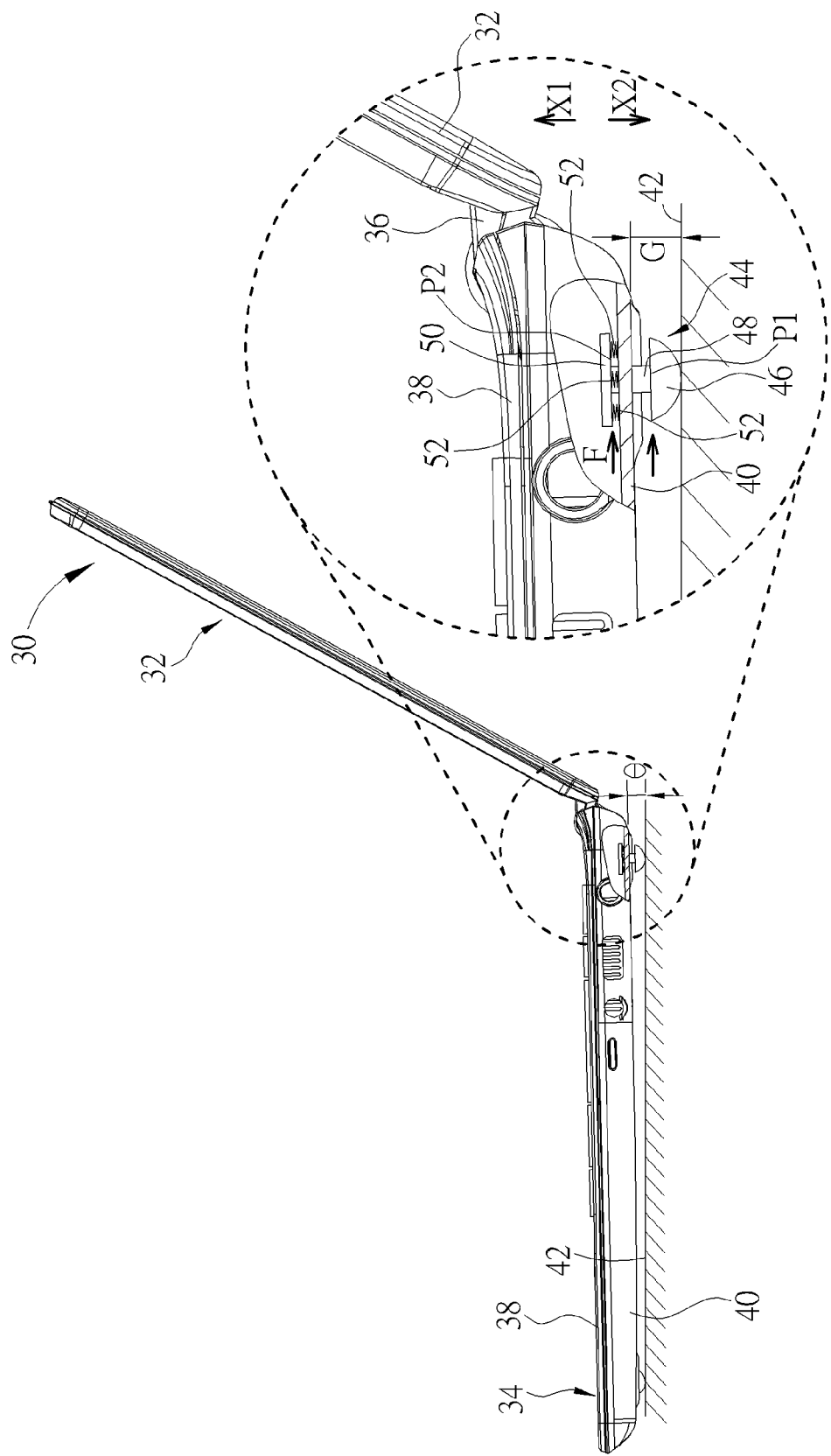
FIG. 4 is a partly sectional diagram of the electronic device in use according to the first embodiment of the present invention.

Please refer to FIG. 3 and FIG. 4. FIG. 4 is a partly sectional diagram of the electronic device 30 in use according to the first embodiment of the present invention. As shown in FIG. 3 and FIG. 4, when the electronic device 30 is desired to be in use, the electronic device 30 is placed on the supporting surface 42 first, as shown in FIG. 3. Meanwhile, the foot cushion member 46 of the foot cushion mechanism 44 abuts against the supporting surface 42, so as to form a gap G between the housing 40 of the electronic device 30 and the supporting surface 42. Accordingly, a heat dissipating module (not shown in figures) of the electronic device 30 is capable of dissipating heat generated by the internal components of the electronic device 30 as functioning via the gap G in a convective manner. In other words, the heat dissipating module generates a flow F to dissipate the heat generated by the internal components of the electronic device 30 as functioning. Meanwhile, the heat carried by the flow F can be transmitted to the shape memory material member 52, such that the shape memory material member 52 is heated. When the shape memory material member 52 is heated, the shape memory material member 52 deforms in a first direction X1 due to shape memory effect, as shown in FIG. 3. As a result, the shape memory material member 52 drives the housing 40 to move along the connecting member 48 and farther away from the foot cushion member 46.

In other words, when the shape memory material member 52 is heated, the shape memory material member 52 generates the shape memory effect and a length of the shape memory material member 52 is shorten such that the housing 40 is driven by the shape memory effect to move from a position shown in FIG. 3 to a position shown in FIG. 4 along the first direction X1, i.e. the housing 40 moves along the first direction X1 farther away from the foot cushion member 46. Accordingly, a distance between the housing 40 and the supporting surface 42 is increased. In other words, when the shape memory material member 52 drives the housing 40 to the position shown in FIG. 4, the gap G between the housing 40 and the supporting surface 42 is increased for facilitating the flow F generated by the heat dissipating module to flow through, so as to enhance efficiency of heat dissipation of the electronic device 30. In other words, the foot cushion mechanism 44 of the present invention is capable of lifting the housing 40 to increase the gap G between the housing 40 and the supporting surface 42, so as to enhance the efficiency of heat dissipation of the electronic device 30. As a result, the inner temperature of the electronic device 30 drops as functioning and thus performance of the electronic device 30 is enhanced.

Furthermore, when the housing 40 is lifted by the foot cushion mechanism 44, it generates an angle θ included by the first module 32 of the electronic device 30 and the supporting surface 42. As shown in FIG. 4, the user can operate the electronic device 30 in a comfortable posture. In other words, the foot cushion mechanism 44 of the present invention can be used for lifting the electronic device 30 for forming the angle θ between the first module 32 of the electronic device 30 and the supporting surface 42, so as to meet ergonomics design of the electronic device 30. Furthermore, when the electronic device 30 is not in use and cooled, heat of the shape memory material member 52 is dissipated and the temperature of the shape memory material member 52 drops. As a result, crystal lattice of the shape memory material member 52 is transformed. For example, the crystal lattice of the shape memory material member 52 can be transformed from high-temperature austenite into low-temperature martensite. Since the low-temperature martensite is easily deformable, the weight of the electronic device 30 can force the shape memory material member 52 to deform in a second direction X2 opposite to the first direction X1 when the crystal lattice of the shape memory material member 52 is transformed into the low-temperature martensite. Accordingly, the length of the shape memory material member 52 is lengthened for recovery. In such a manner, the housing 40 moves from the position shown in FIG. 4 to the position shown in FIG. 3 along the second direction X2, i.e. the housing 40 moves along the second direction X2 toward the foot cushion member 46. As a result, the foot cushion mechanism 44 of the present invention is contained on the second module 34, so as to keep aesthetic feeling of the electronic device 30.

In this embodiment, the shape memory material member 52 is made of shape memory alloy material, but materials for the shape memory material member 52 of the present invention are not limited thereto. For example, the shape memory material member 52 can be made of shape memory plastic material as well. As for which one of the above-mentioned designs is adopted, it depends on practical demands. In addition, the shape memory material member 52 is a spring, as shown in FIG. 3 and FIG. 4. The spring can increase deformation of the shape memory material member 52 in the first direction X1, so as to increase movement that the shape memory material member 52 drives the housing 40.

Figure 5:
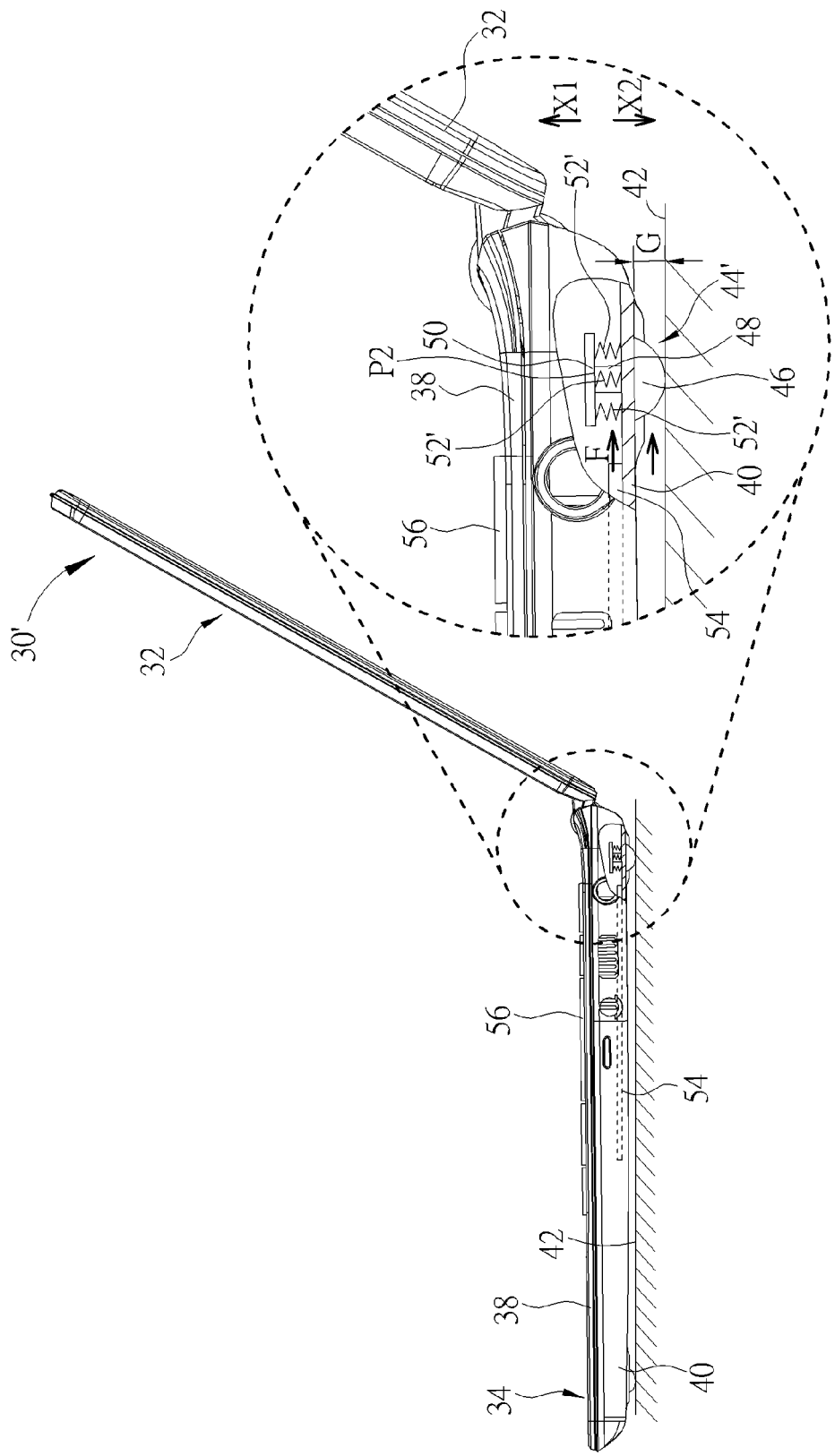
FIG. 5 is a partly sectional diagram illustrating that an electronic device is placed on the supporting surface according to a second embodiment of the present invention.
Figure 6:
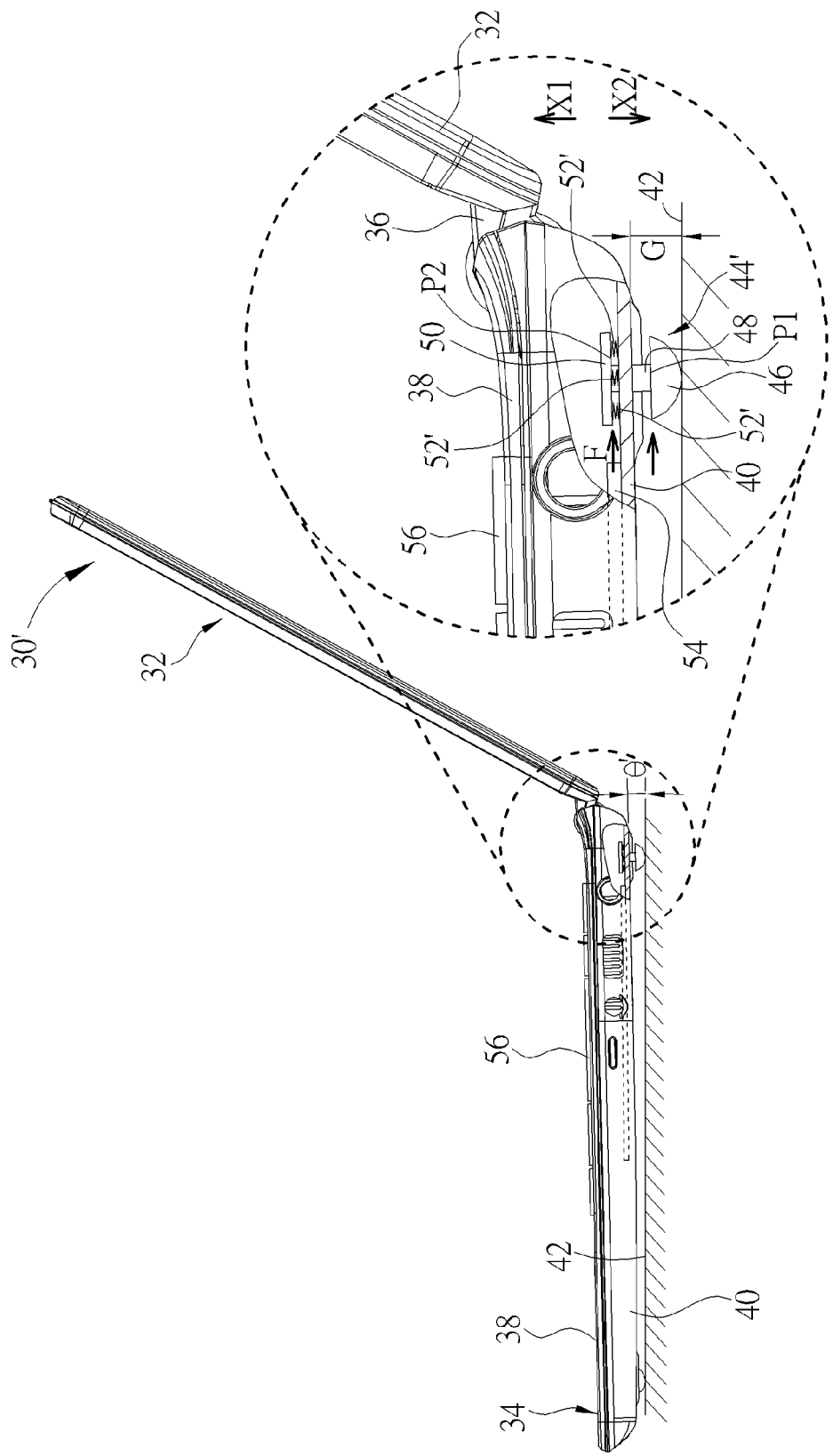
FIG. 6 is a partly sectional diagram of the electronic device in use according to the second embodiment of the present invention.
Figure 7:
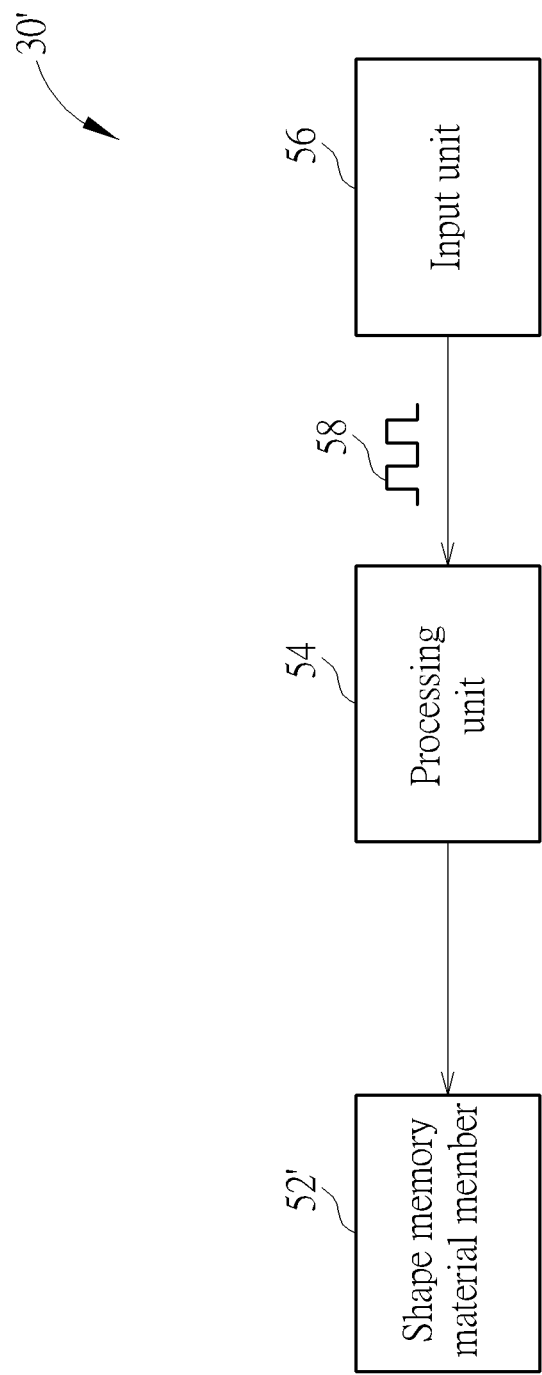
FIG. 7 is a functional block diagram of the electronic device according to the second embodiment of the present invention.

Please refer to FIG. 5 to FIG. 7. FIG. 5 is a partly sectional diagram illustrating that an electronic device 30' is placed on the supporting surface 42 according to a second embodiment of the present invention. FIG. 6 is a partly sectional diagram of the electronic device 30' in use according to the second embodiment of the present invention. FIG. 7 is a functional block diagram of the electronic device 30' according to the second embodiment of the present invention. As shown in FIG. 5 to FIG. 7, the main difference between the electronic device 30' and the aforesaid electronic device 30 is that a foot cushion mechanism 44' of the electronic device 30' further includes a processing unit 54 and an input unit 56. The processing unit 54 is coupled to a shape memory material member 52' of the foot cushion mechanism 44' and the input unit 56. In this embodiment, the processing unit 54 is a main board, the input unit 56 is a keyboard, and the shape memory material member 52' is made of one-way shape memory alloy material.

It should be noticed that the one-way shape memory alloy material has one way shape memory effect, i.e. the one way-shape memory alloy material can transform into a transformed configuration by variation of temperature, such as rising temperature, but it can not again transform from the transformed configuration into an untransformed configuration by variation of temperature, such as dropping temperature. For example, when the temperature of the shape memory material member 52' made of the one-way shape memory alloy material rises up to a threshold temperature, the crystal lattice of the shape memory material member 52' is transformed to the high-temperature austenite. As a result, the shape memory material member 52' deforms due to shape memory effect, e.g. the length of the shape memory material member 52' is shortened. When the temperature of the shape memory material member 52' drops below the threshold temperature, the crystal lattice of the shape memory material member 52' is transformed from the high temperature austenite into the low temperature martensite. Meanwhile, the shape memory material member 52' does not deform since the shape memory effect of the shape memory material member 52' does not occur again, i.e. the shape memory material member 52' keeps the deformed status resulting from the former shape memory effect, e.g. the status that the length of the shape memory material member 52' is shortened.

As mentioned above, when the foot cushion mechanism 44' is desired to adjust the distance between the electronic device 30' and the supporting surface 42, an input signal 58 is input by the input unit 56 of the foot cushion mechanism 44', as shown in FIG. 7. Meanwhile, the processing unit 54 of the foot cushion mechanism 44' receives the input signal 58 from the input unit 56. When receiving the input signal 58, the processing unit 54 supplies a power to the shape memory material member 52' so as to heat the shape memory material member 52'. When the shape memory material member 52' is heated by the power supplied by the processing unit 54, the temperature of the shape memory material member 52' rises up to the threshold temperature. As such, a length of the shape memory material member 52' is shortened due to the shape memory effect. Accordingly, the shape memory material member 52' drives the housing 40 from a position shown in FIG. 5 to a position shown in FIG. 6 in the first direction X1, i.e. the housing 40 moves along the first direction X1 farther away from the foot cushion member 46. In such a manner, the distance between the housing 40 and the supporting surface 42 is increased. In other words, when the shape memory material member 52' drives the housing 40 to move to the position shown in FIG. 6, it increases the gap G between the housing 40 and the supporting surface 42 for facilitating the flow F generated by a heat dissipating module of the electronic device 30' to flow through, so as to enhance the efficiency of heat dissipation of the electronic device 30'.

In other words, the input unit 56 and the processing unit 54 can be utilized for controlling the foot cushion mechanism 44' to lift the housing 40, such that the gap G between the housing 40 and the supporting surface 42 is increased for enhancing the efficiency of heat dissipation of the electronic device 30'. As a result, it drops the inner temperature of the electronic device 30' in use for enhancing the performance of the electronic device 30'. Furthermore, when the housing 40 is lifted by the foot cushion mechanism 44', it forms an angle θ' included by the first module 32 of the electronic device 30' and the supporting surface 42. As shown in FIG. 6, the user can operate the electronic device 30' in a comfortable posture. In other words, the input unit 56 and the processing unit 54 can be further used for controlling the foot cushion mechanism 44' to lift the housing 40, so as to adjust the angle θ' between the first module 32 of the electronic device 30' and the supporting surface 42 for meeting ergonomics design of the electronic device 30'. Components with denoted in this embodiment identical to those in the aforesaid embodiment have identical structures and functions, and further description is omitted herein for simplicity.

Figure 8:
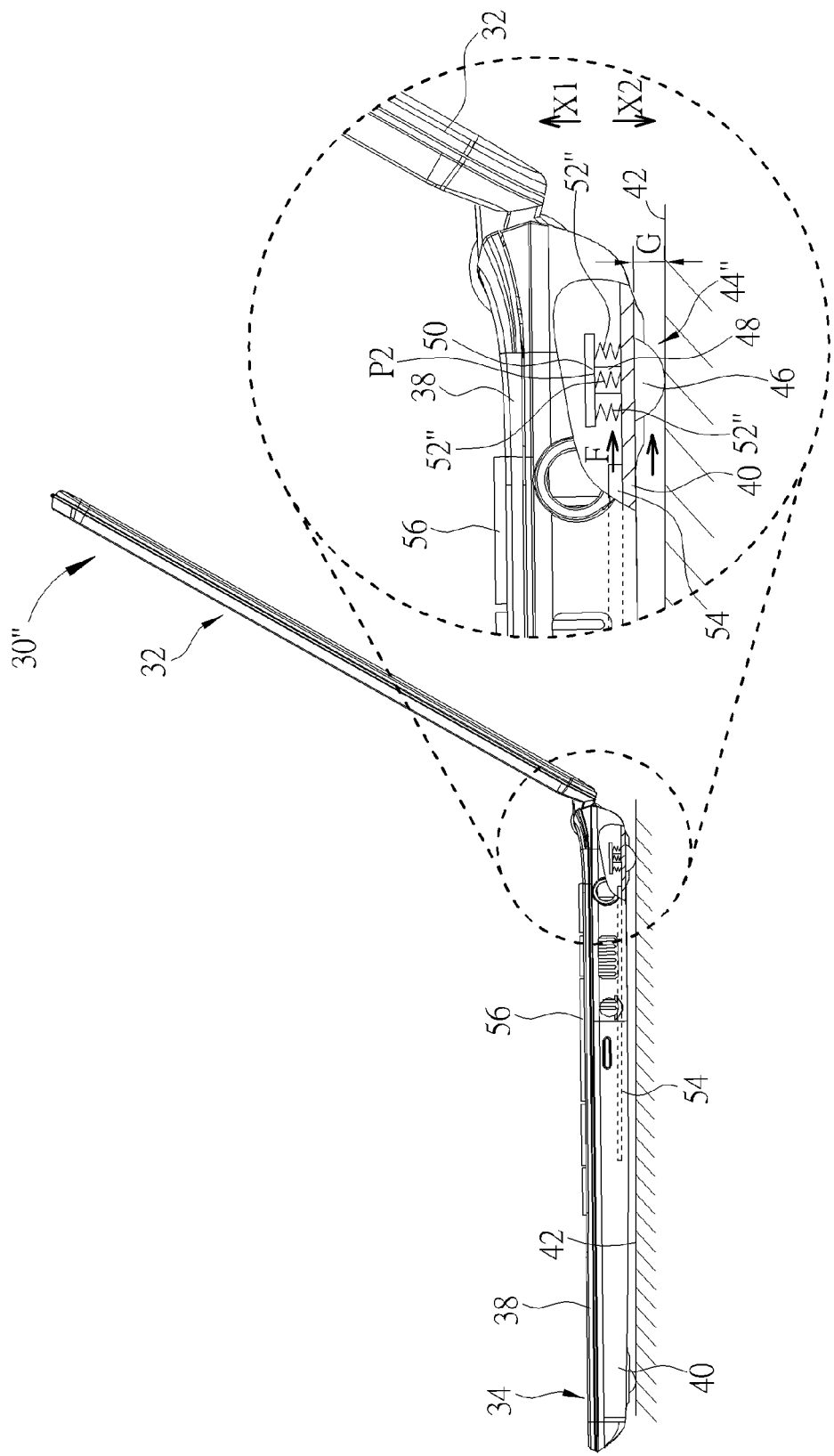
FIG. 8 is a partly sectional diagram illustrating that an electronic device is placed on the supporting surface according to a third embodiment of the present invention.
Figure 9:
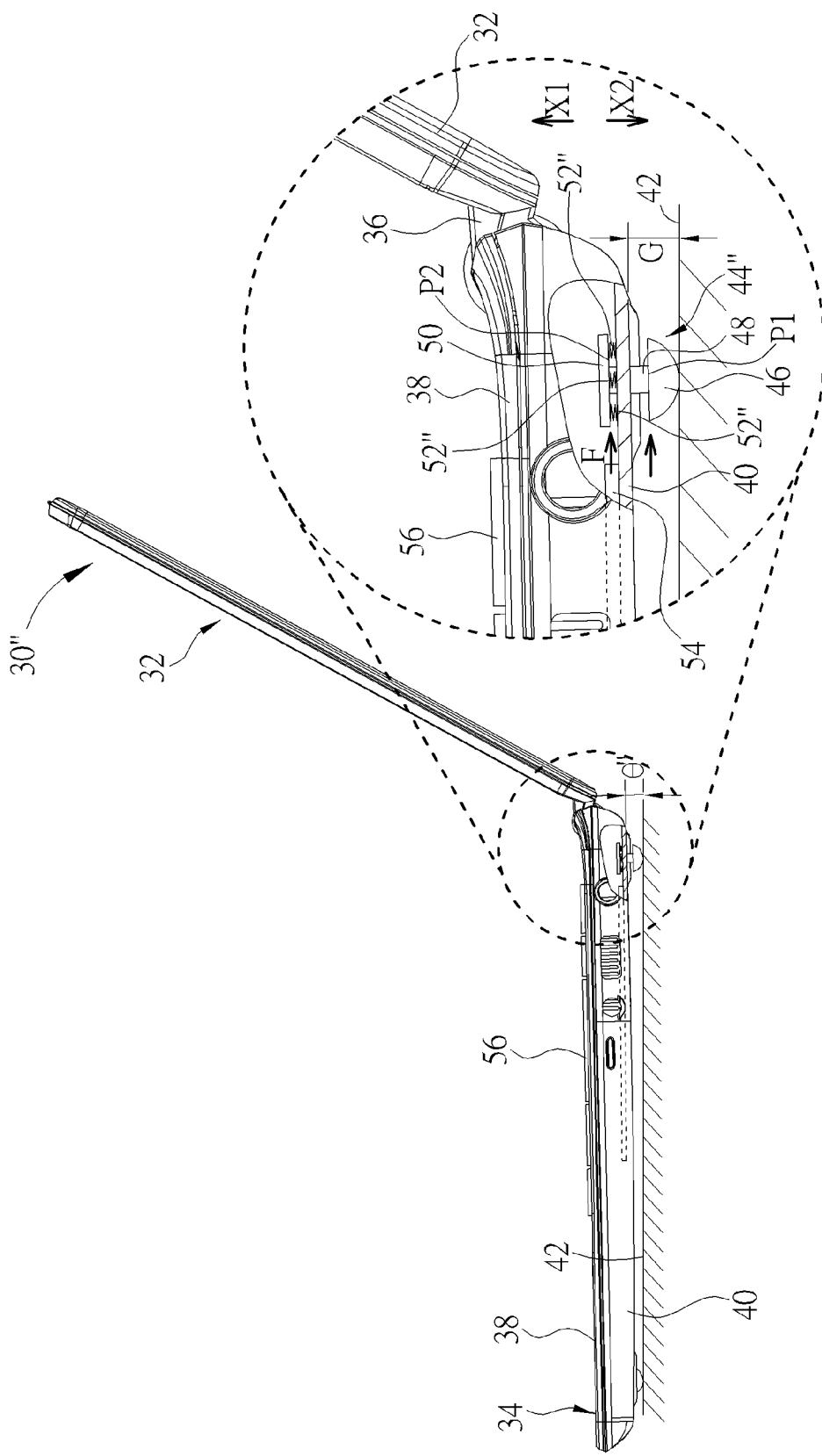
FIG. 9 is a partly sectional diagram of the electronic device in use according to the third embodiment of the present invention.
Figure 10:
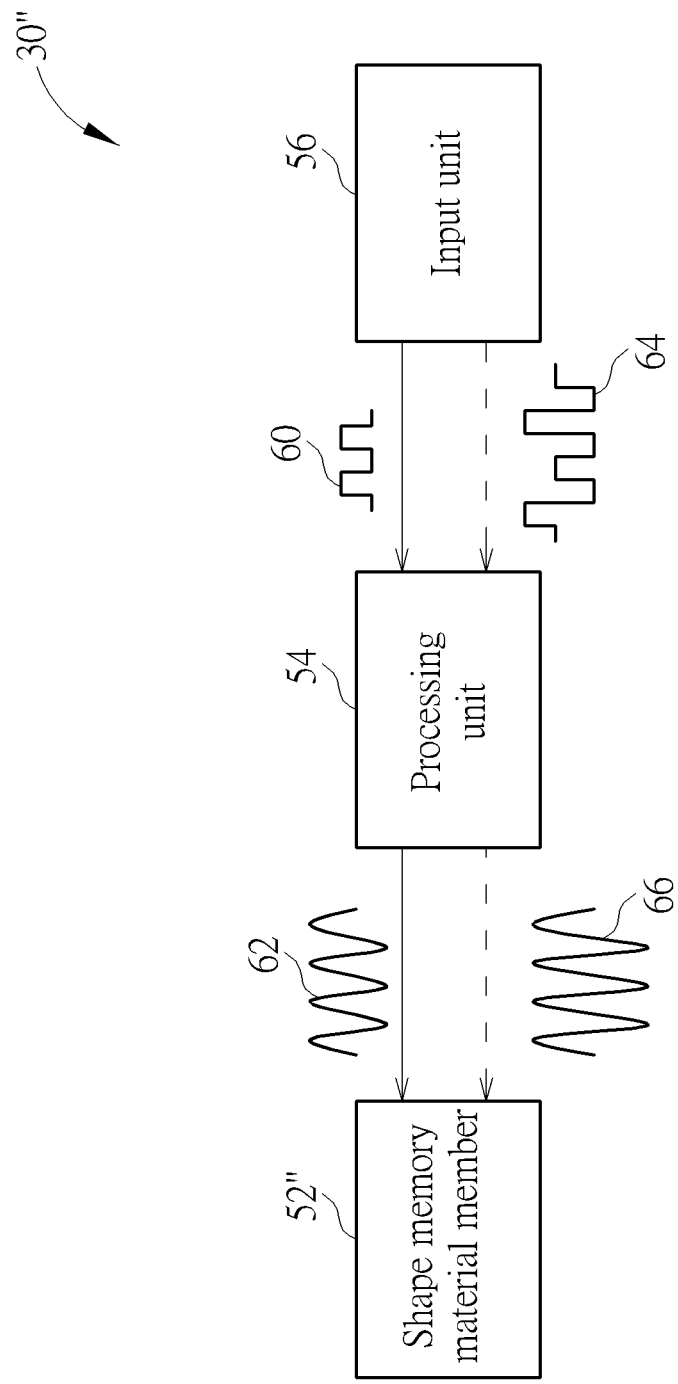
FIG. 10 is a functional block diagram of the electronic device according to the third embodiment of the present invention.

Please refer to FIG. 8 to FIG. 10. FIG. 8 is a partly sectional diagram illustrating that an electronic device 30' is placed on the supporting surface 42 according to a third embodiment of the present invention. FIG. 9 is a partly sectional diagram of the electronic device 30' in use according to the third embodiment of the present invention. FIG. 10 is a functional block diagram of the electronic device 30" according to the third embodiment of the present invention. As shown in FIG. 8 to FIG. 10, the main difference between the electronic device 30" and the aforesaid electronic device 30' is that a shape memory material member 52' of a foot cushion mechanism 44" of the electronic device 30" is made of two-way shape memory alloy material. It should be noticed that the two-way shape memory alloy material has two way shape memory effect, i.e. the two-way shape memory alloy material can transform into a transformed configuration by variation of temperature, such as rising temperature, and it can again transform from the transformed configuration into an untransformed configuration by variation of temperature, such as dropping temperature.

For example, when the temperature of the shape memory material member 52" made of the two-way shape memory alloy material rises up to a first threshold temperature, the crystal lattice of the shape memory material member 52" is transformed to the high temperature austenite. As a result, the shape memory material member 52' deforms due to shape memory effect, e.g. the length of the shape memory material member 52' is shortened. When the temperature of the shape memory material member 52" drops below a second threshold temperature, the crystal lattice of the shape memory material member 52" is transformed from the high temperature austenite into the low temperature martensite. The difference between the two-way shape memory alloy material and the one-way shape memory alloy material is that the crystal lattice of the two-way shape memory alloy material can be transformed after an adequate training when the two-way shape memory alloy material is in low temperature martensite status. As a result, the shape memory material member 52' deforms again as being in the second threshold temperature lower than the first threshold temperature, i.e. a length of the shape memory material member 52" recovers.

As mentioned above, when the foot cushion mechanism 44" is desired to adjust the distance between the electronic device 30" and the supporting surface 42, a first input signal 60 is input by the input unit 56 of the foot cushion mechanism 44", as shown in FIG. 10. For example, the user can utilize an input key of the input unit 56 to input the first input signal 60. When the processing unit 54 receives the first input signal 60, the processing unit 54 supplies a first power 62 to the shape memory material member 52", so as to heat the shape memory material member 52". When the shape memory material member 52' is heated by the first power 62 supplied by the processing unit 54, the temperature of the shape memory material member 52' rises up to the first threshold temperature. The crystal lattice of the shape memory material member 52' is transformed into the high temperature austenite, such that the length of the shape memory material member 52' is shortened due to the shape memory effect. Accordingly, the shape memory material member 52" drives the housing 40 from a position shown in FIG. 8 to a position shown in FIG. 9 in the first direction X1, i.e. the housing 40 moves along the first direction X1 farther away from the foot cushion member 46. In such a manner, the distance between the housing 40 and the supporting surface 42 is increased. In other words, when the shape memory material member 52" drives the housing 40 to move to the position shown in FIG. 9, it increases the gap G between the housing 40 and the supporting surface 42 for facilitating the flow F generated by a heat dissipating module of the electronic device 30' to flow through, so as to enhance the efficiency of heat dissipation of the electronic device 30".

In other words, the input unit 56 and the processing unit 54 can be utilized for controlling the foot cushion mechanism 44" to lift the housing 40, such that the gap G between the housing 40 and the supporting surface 42 is increased for enhancing the efficiency of heat dissipation of the electronic device 30". As a result, it drops the inner temperature of the electronic device 30' in use for enhancing the performance of the electronic device 30". Furthermore, when the housing 40 is lifted by the foot cushion mechanism 44", it forms an angle θ" included by the first module 32 of the electronic device 30" and the supporting surface 42. As shown in FIG. 9, the user can operate the electronic device 30' in a comfortable posture. In other words, the input unit 56 and the processing unit 54 can be further used for controlling the foot cushion mechanism 44" to lift the housing 40, so as to adjust the angle θ" between the first module 32 of the electronic device 30" and the supporting surface 42 for meeting ergonomics design of the electronic device 30".

In this embodiment, the foot cushion mechanism 44" can be further contained on the electronic device 30". More detailed description for principles that the foot cushion mechanism 44" is contained on the electronic device 30" is provided as follows. When the foot cushion mechanism 44" is desired to be recovered from the status shown in FIG. 9 back to the status shown in FIG. 8, a second input signal 64 is input by the input unit 56 of the foot cushion mechanism 44", as shown in FIG. 10. For example, the user can utilize another input key of the input unit 56 to input the second input signal 64, and the processing unit 54 of the foot cushion mechanism 44" can receive the second input signal 64 from the input unit 56. When the processing unit 54 receives the second input signal 64, the processing unit 54 supplies a second power 66 to the shape memory material member 52". In this embodiment, the second power 66 is smaller than the first power 62. Accordingly, the shape memory material member 52" is heated by the smaller second power 66 instead of the first power 62. In such a manner, the temperature of the shape memory material member 52" gradually drops from the higher first threshold temperature to the lower second threshold temperature.

In other words, when the shape memory material member 52" is heated by the second power 66 supplied by the processing unit 54, the temperature of the shape memory material member 52" drops below the second threshold temperature. The crystal lattice of the shape memory material member 52" is transformed into the low temperature martensite, such that the length of the shape memory material member 52" made of the two-way shape memory alloy material is lengthened due to another shape memory effect. In such a manner, the shape memory material member 52" drives the housing 40 to move from the position shown in FIG. 9 to the position shown in FIG. 8 along the second direction X2, i.e. the housing 40 moves along the second direction X2 toward the foot cushion member 46, so as to contain the foot cushion mechanism 44" on the electronic device 30". Components with denoted in this embodiment identical to those in the aforesaid embodiment have identical structures and functions, and further description is omitted herein for simplicity.

Figure 11:
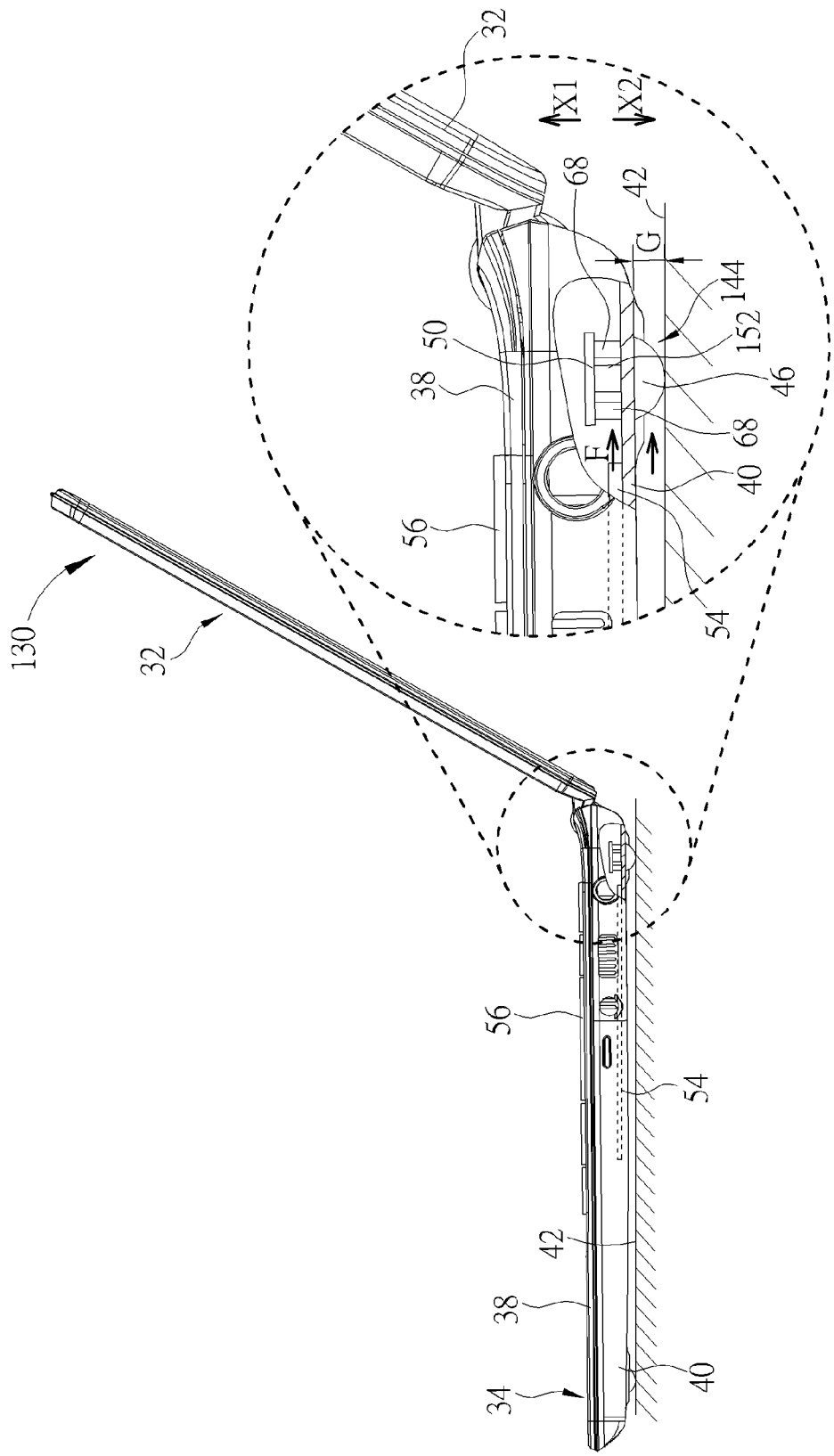
FIG. 11 is a partly sectional diagram illustrating that an electronic device is placed on the supporting surface according to a fourth embodiment of the present invention.
Figure 12:
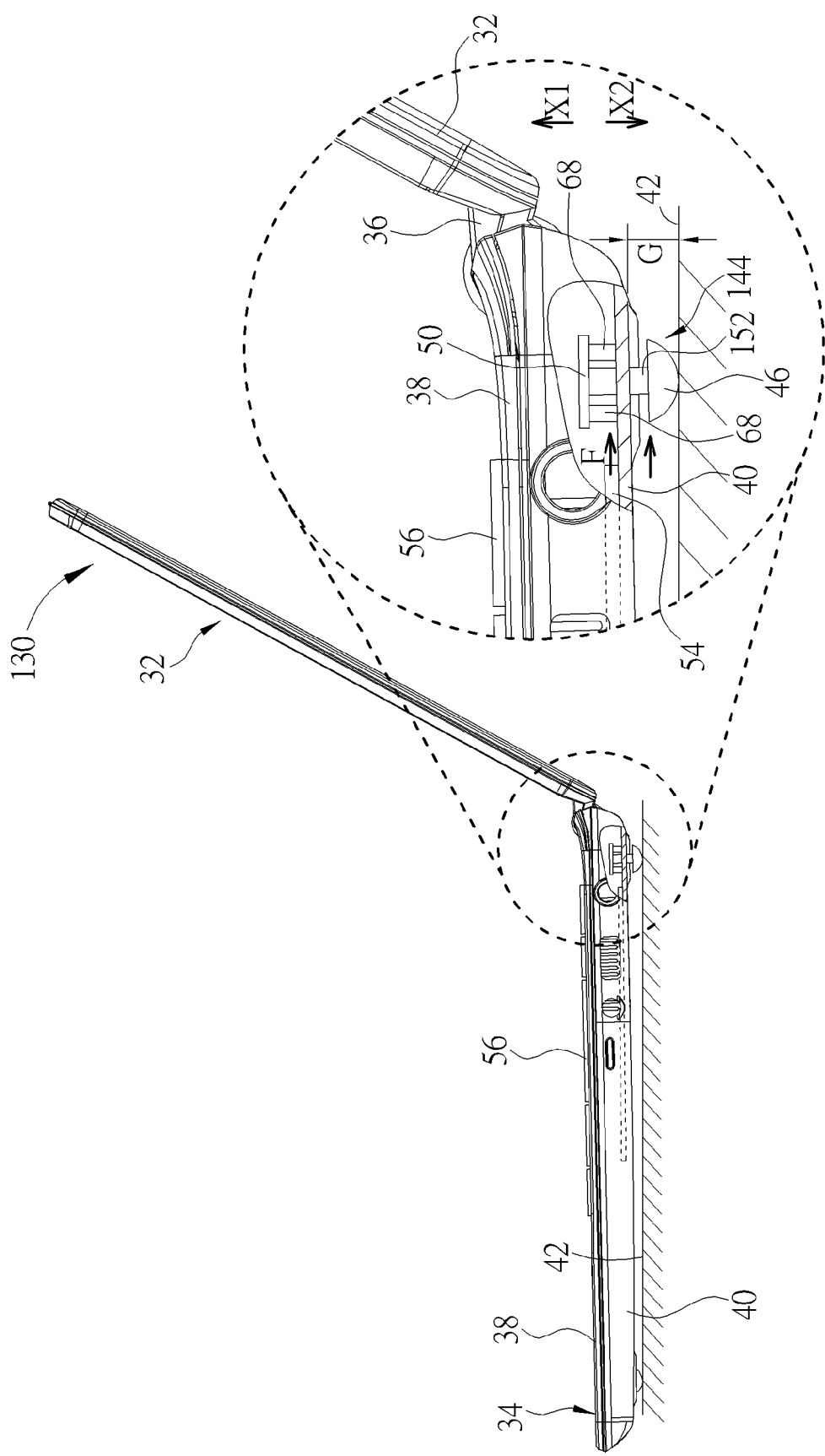
FIG. 12 is a partly sectional diagram of the electronic device in use according to the fourth embodiment of the present invention.
Figure 13:
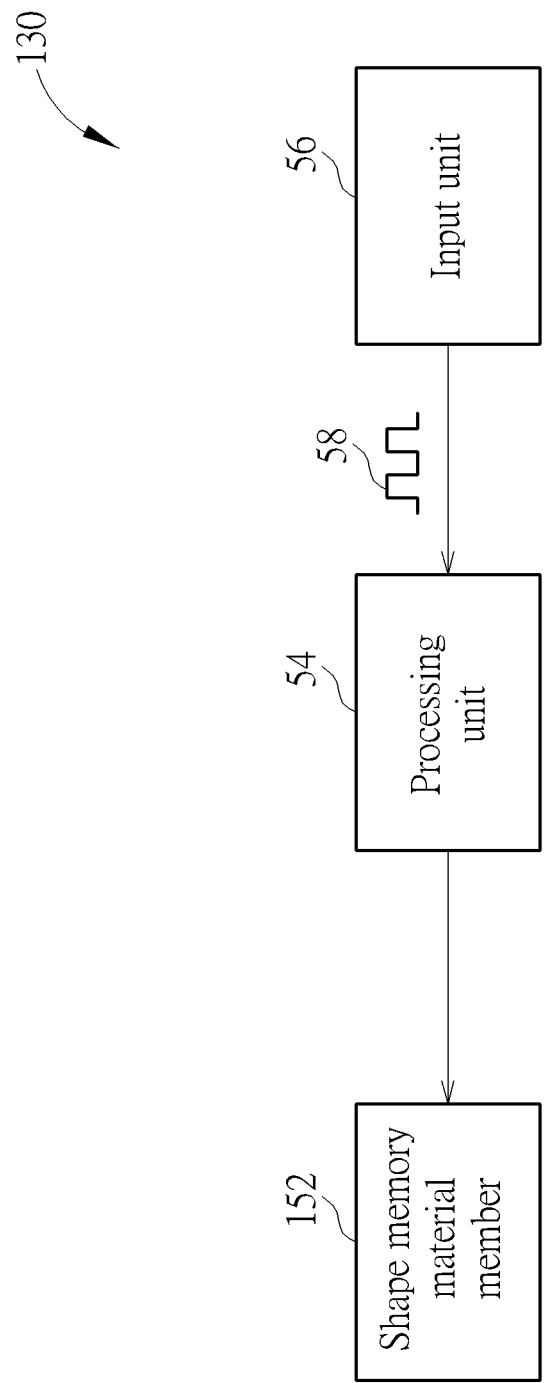
FIG. 13 is a functional block diagram of the electronic device according to the fourth embodiment of the present invention.

Please refer to FIG. 11 to FIG. 13. FIG. 11 is a partly sectional diagram illustrating that an electronic device 130 is placed on the supporting surface 42 according to a fourth embodiment of the present invention. FIG. 12 is a partly sectional diagram of the electronic device 130 in use according to the fourth embodiment of the present invention. FIG. 13 is a functional block diagram of the electronic device 130 according to the fourth embodiment of the present invention. As shown in FIG. 11 to FIG. 13, the main difference between the electronic device 130 and the aforesaid electronic device 30' is that a shape memory material member 152 of a foot cushion mechanism 144 of the electronic device 130 connects the holding base 50 and the foot cushion member 46. The shape memory material member 152 is used for driving and guiding the housing 40 of the electronic device 130 to move along the first direction X1 farther away from the foot cushion member 46. Alternatively, the shape memory material member 152 is further used for driving the and guiding the housing 40 of the electronic device 130 to move along the second direction X2 toward the foot cushion member 46.

Furthermore, the foot cushion mechanism 144 further includes a bridging structure 68 for bridging the holding base 50 and the housing 40. The bridging structure 68 is used for supporting the holding base 50 on the housing 40, so as to provide the shape memory material member 152 with a support as driving the housing 40 of the electronic device 130 to move along the first direction X1 or along the second direction X2. In this embodiment, the bridging structure 68 is a rib and the bridging structure 68 and the holding base 50 are integrally formed. In this embodiment, the foot cushion mechanism 144 includes one shape memory material member 152 and two bridging structures 68. Amounts of the shape memory material member 152 and the bridging structure 68 are not limited to those illustrated in figures in this embodiment. For example, the foot cushion mechanism 144 can include two shape memory material members 152 and one bridging structure 68 as well. As for which one of the above-mentioned designs is adopted, it depends on practical demands. Furthermore, the shape memory material member 152 is a guiding post and made of one-way shape memory alloy material, and the processing unit 54 of the foot cushion mechanism 144 is coupled to the shape memory material member 152.

When the foot cushion mechanism 144 is desired to adjust the distance between the electronic device 130 and the supporting surface 42, the input signal 58 is input by the input unit 56 of the foot cushion mechanism 144, as shown in FIG. 13. Meanwhile, the processing unit 54 of the foot cushion mechanism 144 receives the input signal 58 from the input unit 56. When receiving the input signal 58, the processing unit 54 supplies a power to heat the shape memory material member 152. When the shape memory material member 152 is heated by the power supplied by the processing unit 54, the temperature of the shape memory material member 152 rises up to the threshold temperature. The length of the shape memory material member 152 is lengthened due to the shape memory effect. Accordingly, the shape memory material member 152 pushes the holding base 50 for driving the housing 40 to move from a position shown in FIG. 11 to a position shown in FIG. 12 along the first direction X1, i.e. the housing 40 moves along the first direction X1 farther away from the foot cushion member 46. In such a manner, the distance between the housing 40 and the supporting surface 42 is increased. In other words, when the shape memory material member 152 drives the housing 40 to move to the position shown in FIG. 12, it increases the gap G between the housing 40 and the supporting surface 42 for facilitating the flow F generated by a heat dissipating module of the electronic device 130 to flow through, so as to enhance the efficiency of heat dissipation of the electronic device 130. Components with denoted in this embodiment identical to those in the aforesaid embodiment have identical structures and functions, and further description is omitted herein for simplicity.

Figure 14:
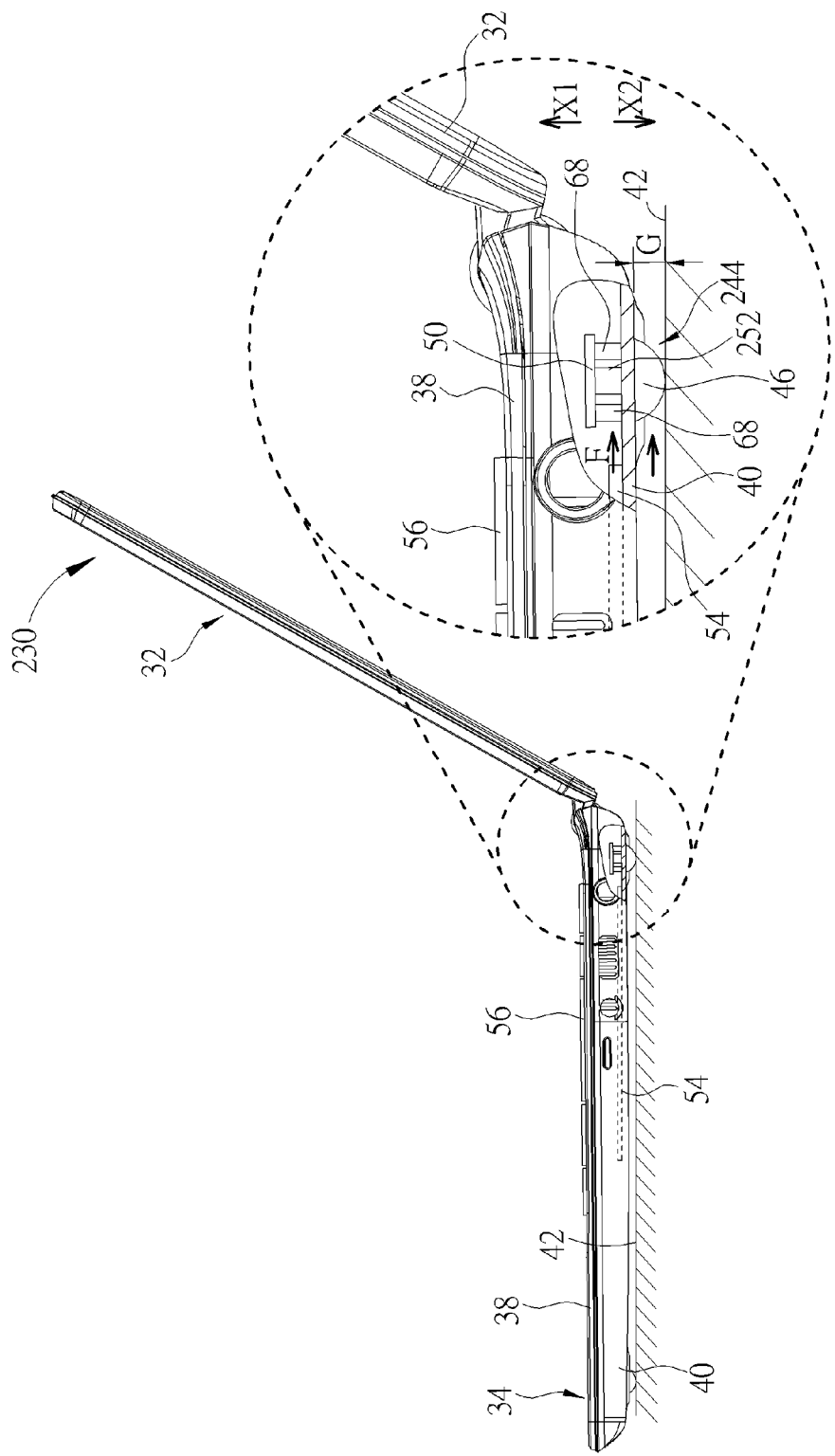
FIG. 14 is a partly sectional diagram illustrating that an electronic device is placed on the supporting surface according to a fifth embodiment of the present invention.
Figure 15:
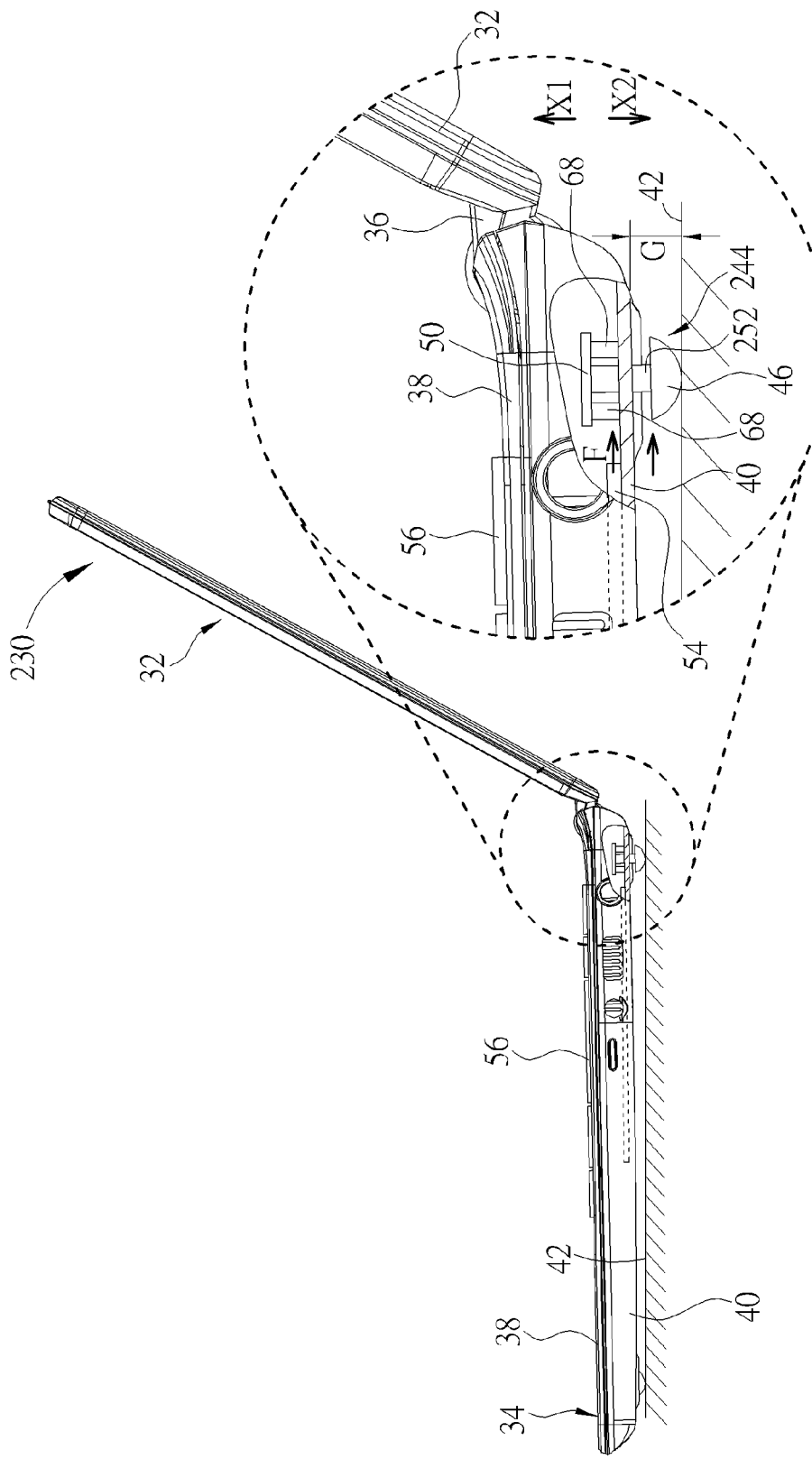
FIG. 15 is a partly sectional diagram of the electronic device in use according to the fifth embodiment of the present invention.
Figure 16:
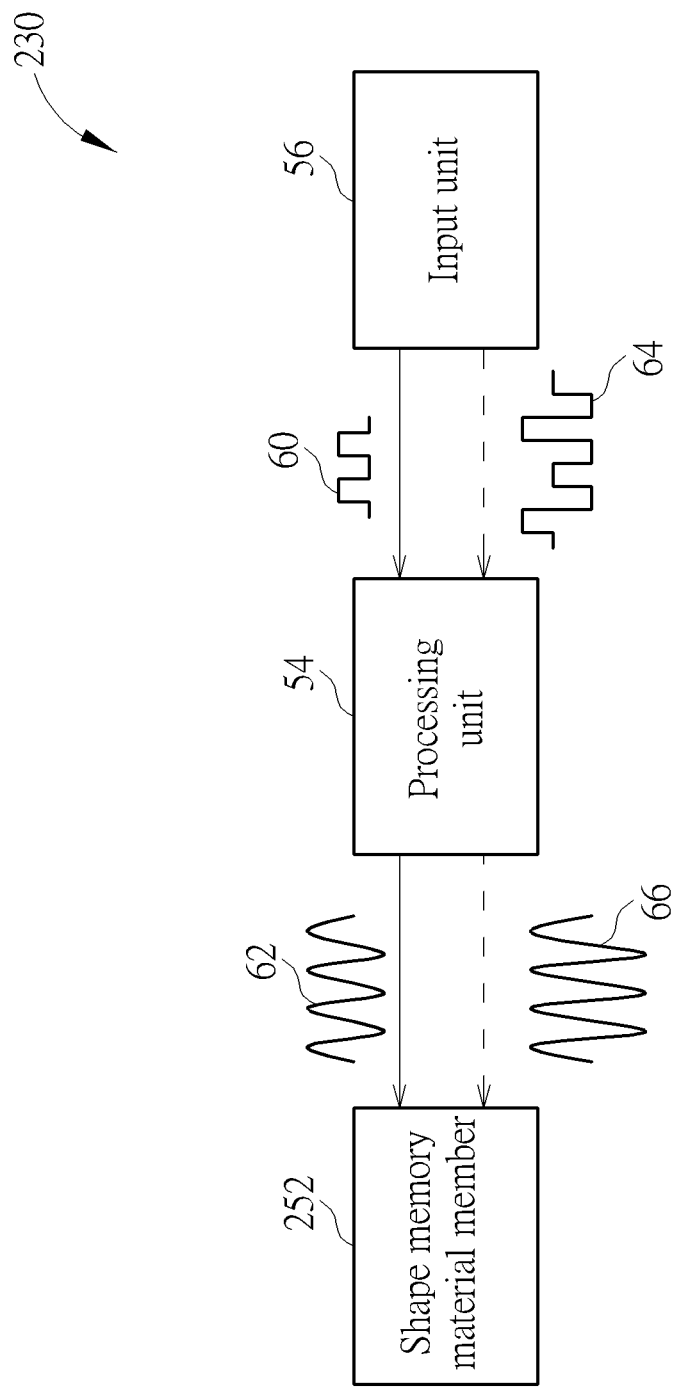
FIG. 16 is a functional block diagram of the electronic device according to the fifth embodiment of the present invention.

Please refer to FIG. 14 to FIG. 16. FIG. 14 is a partly sectional diagram illustrating that an electronic device 230 is placed on the supporting surface 42 according to a fifth embodiment of the present invention. FIG. 15 is a partly sectional diagram of the electronic device 230 in use according to the fifth embodiment of the present invention. FIG. 16 is a functional block diagram of the electronic device 230 according to the fifth embodiment of the present invention. As shown in FIG. 14 to FIG. 16, the main difference between the electronic device 230 and the aforesaid electronic device 130 is that a shape memory material member 252 of a foot cushion mechanism 244 of the electronic device 230 is made of two-way shape memory alloy material.

When the foot cushion mechanism 244 is desired to adjust the distance between the electronic device 230 and the supporting surface 42, the first input signal 60 is input by the input unit 56 of the foot cushion mechanism 244, as shown in FIG. 16. When receiving the first input signal 60, the processing unit 54 supplies the first power 62 to the shape memory material member 252, so as to heat the shape memory material member 252. When the shape memory material member 252 is heated by the power supplied by the processing unit 54, the temperature of the shape memory material member 252 rises up to the first threshold temperature. The length of the shape memory material member 252 is lengthened due to the shape memory effect. Accordingly, the shape memory material member 252 drives the housing 40 from a position shown in FIG. 14 to a position shown in FIG. 15 along the first direction X1, i.e. the housing 40 moves along the first direction X1 farther away from the foot cushion member 46. In such a manner, the distance between the housing 40 and the supporting surface 42 is increased. In other words, when the shape memory material member 252 drives the housing 40 to move to the position shown in FIG. 15, it increases the gap G between the housing 40 and the supporting surface 42 for facilitating the flow F generated by a heat dissipating module of the electronic device 230 to flow through, so as to enhance the efficiency of heat dissipation of the electronic device 230.

When the foot cushion mechanism 244 is desired to be recovered from the status shown in FIG. 15 back to the status shown in FIG. 14, the second input signal 64 is input by the input unit 56 of the foot cushion mechanism 244, as shown in FIG. 16. When receiving the second input signal 64, the processing unit 54 supplies the second power 66 to the shape memory material member 252, so as to heat the shape memory material member 252. In this embodiment, the second power 66 is smaller than the first power 62. Accordingly, the shape memory material member 252 is heated by the smaller second power 66 instead of the first power 62. In such a manner, the temperature of the shape memory material member 252 gradually drops from the higher first threshold temperature to the lower second threshold temperature. In other words, when the shape memory material member 252 is heated by the second power 66 supplied by the processing unit 54, the temperature of the shape memory material member 252 drops below the second threshold temperature. The length of the shape memory material member 252 shortened due to another shape memory effect. In such a manner, the shape memory material member 252 drives the housing 40 to move from the position shown in FIG. 15 to the position shown in FIG. 14 along the second direction X2, i.e. the housing 40 moves along the second direction X2 toward the foot cushion member 46, so as to contain the foot cushion mechanism 244 on the electronic device 230. Components with denoted in this embodiment identical to those in the aforesaid embodiment have identical structures and functions, and further description is omitted herein for simplicity.

Compared to the prior art, the shape memory material member of the foot cushion mechanism of the present invention selectively connects the housing and the holding base or connects the holding base and the foot cushion member. When the shape memory material member of the foot cushion mechanism of the present invention is heated, the shape memory material member deforms due to shape memory effect, so as to drive the housing away from the foot cushion member. Accordingly, the distance between the housing and the supporting surface is increased. In other words, the foot mechanism of the present invention is used for lifting the housing for increasing the gap between the housing and the supporting surface, so as to enhance the efficiency of heat dissipation of the electronic device. As a result, the inner temperature of the electronic device drops as functioning and thus performance of the electronic device is enhanced. In addition, the foot cushion mechanism of the present invention can further recover the deformed shape memory material member by applying an external force or by current control, so as to contain the foot cushion mechanism on the electronic device for keeping aesthetic feeling of the electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A foot cushion mechanism, comprising:
 a foot cushion member separating from a housing and abutting against a supporting surface;
 a holding base separating from the housing, the holding base and the foot cushion member being respectively installed on opposite sides of the housing; and
 at least one shape memory material member with an end connected to the holding base and another end selectively connected to the housing or the foot cushion mechanism, such that the housing is movable between the foot cushion member and the holding base, the at least one shape memory material member deforming when being heated due to a shape memory effect, the housing is driven by the shape memory effect to move away from the foot cushion member such that a distance between the housing and the supporting surface is increased.

2. The foot cushion mechanism of claim 1, wherein the at least one shape memory material member connects the housing and the holding base, and the foot cushion mechanism further comprises:

at least one connecting member passing through the housing and slidable relative to the housing, a first end of the at least one connecting member connecting the foot cushion member, a second end of the at least one connecting member connecting the holding base.

3. The foot cushion mechanism of claim 2, wherein the at least one shape memory material member is made of one-way shape memory alloy material, and the foot cushion mechanism further comprises:

a processing unit coupled to the at least one shape memory material member, a length of the at least one shape memory material member being shortened when the shape memory material member is heated by a power supplied by the processing unit such that the housing moves along a first direction farther away from the foot cushion member.

4. The foot cushion mechanism of claim 2, wherein the at least one shape memory material member is made of two-way shape memory alloy material, and the foot cushion mechanism further comprises:

a processing unit coupled to the at least one shape memory material member, a length of the at least one shape memory material member being shortened when the shape memory material member is heated by a first power supplied by the processing unit such that the housing moves along a first direction farther away from the foot cushion member, the length of the at least one shape memory material member being lengthened when the shape memory material member is heated by a second power supplied by the processing unit such that the housing moves along a second direction toward the foot cushion member.

5. The foot cushion mechanism of claim 2, wherein the at least one shape memory material member is a spring.

6. The foot cushion mechanism of claim 2, wherein the at least one connecting member is a rib.

7. The foot cushion mechanism of claim 2, wherein the at least one connecting member and the holding base are integrally formed.

8. The foot cushion mechanism of claim 1, wherein the at least one shape memory material member connects the holding base and the foot cushion member, and the foot cushion mechanism further comprises at least one bridging structure for bridging the holding base and the housing.

9. The foot cushion mechanism of claim 8, wherein the at least one shape memory material member is made of one-way shape memory alloy material, and the foot cushion mechanism further comprises:

a processing unit coupled to the at least one shape memory material member, a length of the at least one shape memory material member being lengthened when the shape memory material member is heated by a power supplied by the processing unit such that the housing moves along a first direction farther away from the foot cushion member.

10. The foot cushion mechanism of claim 8, wherein the at least one shape memory material member is made of two-way shape memory alloy material, and the foot cushion mechanism further comprises:

a processing unit coupled to the at least one shape memory material member, a length of the at least one shape memory material member being lengthened when the shape memory material member is heated by a first power supplied by the processing unit such that the housing moves along a first direction farther away from the foot cushion member, the length of the at least one shape memory material member being shortened when the shape memory material member is heated by a second power supplied by the processing unit such that the housing moves along a second direction toward the foot cushion member.

11. The foot cushion mechanism of claim 8, wherein the at least one shape memory material member is a guiding post.

12. The foot cushion mechanism of claim 8, wherein the at least one bridging structure and the holding base are integrally formed.

13. The foot cushion mechanism of claim 1, wherein the at least one shape memory material member is made of shape memory alloy material or shape memory plastic material.

14. An electronic device, comprising:
a housing; and
a foot cushion mechanism, comprising:
a foot cushion member separating from a housing and abutting against a supporting surface;
a holding base separating from the housing, the holding base and the foot cushion member being respectively installed on opposite sides of the housing; and
at least one shape memory material member with an end connected to the holding base and another end selectively connected to the housing or the foot cushion mechanism, such that the housing is movable between the foot cushion member and the holding base, the at least one shape memory material member deforming when being heated due to a shape memory effect, the housing is driven by the shape memory effect to move away from the foot cushion member such that a distance between the housing and the supporting surface is increased.

15. The electronic device of claim 14, wherein the at least one shape memory material member connects the housing and the holding base, and the foot cushion mechanism further comprises:

at least one connecting member passing through the housing and slidable relative to the housing, a first end of the at least one connecting member connecting the foot cushion member, a second end of the at least one connecting member connecting the holding base.

16. The electronic device of claim 15, wherein the at least one shape memory material member is made of one-way shape memory alloy material, and the foot cushion mechanism further comprises:

a processing unit coupled to the at least one shape memory material member, a length of the at least one shape memory material member being shortened when the shape memory material member is heated by a power supplied by the processing unit such that the housing moves along a first direction farther away from the foot cushion member.

17. The electronic device of claim 15, wherein the at least one shape memory material member is made of two-way shape memory alloy material, and the foot cushion mechanism further comprises:

a processing unit coupled to the at least one shape memory material member, a length of the at least one shape memory material member being shortened when the shape memory material member is heated by a first power supplied by the processing unit such that the housing moves along a first direction farther away from the foot cushion member, the length of the at least one shape memory material member being lengthened when the shape memory material member is heated by a second power supplied by the processing unit such that the housing moves along a second direction toward the foot cushion member.

18. The electronic device of claim 14, wherein the at least one shape memory material member connects the holding base and the foot cushion member, and the foot cushion mechanism further comprises at least one bridging structure for bridging the holding base and the housing.

19. The electronic device of claim 18, wherein the at least one shape memory material member is made of one-way shape memory alloy material, and the foot cushion mechanism further comprises:

a processing unit coupled to the at least one shape memory material member, a length of the at least one shape memory material member being lengthened when the shape memory material member is heated by a power supplied by the processing unit such that the housing moves along a first direction farther away from the foot cushion member.

20. The electronic device of claim 18, wherein the at least one shape memory material member is made of two-way shape memory alloy material, and the foot cushion mechanism further comprises:

a processing unit coupled to the at least one shape memory material member, a length of the at least one shape memory material member being lengthened when the shape memory material member is heated by a first power supplied by the processing unit such that the housing moves along a first direction farther away from the foot cushion member, the length of the at least one shape memory material member being shortened when the shape memory material member is heated by a second power supplied by the processing unit such that the housing moves along a second direction toward the foot cushion member.

* * * * *